United States Patent Office 3,299,002
Patented Jan. 17, 1967

3,299,002
PESTICIDALLY ACTIVE PHENOL-FORMALDE-
HYDE-TRIALKYLTIN-OXIDE RESINS
Walter A. Stamm, Dobbs Ferry, and Warren B. Stanton, New York, N.Y., assignors to Stauffer Chemical Company, New York, N.Y., a corporation of Delaware
No Drawing. Filed Feb. 20, 1963, Ser. No. 260,032
4 Claims. (Cl. 260—59)

This invention pertains to phenol-formaldehyde resins which have been rendered pesticidally active by modifying the resin with trialkyltin oxides. The invention also pertains to pesticidal compositions having as the active component thereof one of the aforesaid modified phenol-formaldehyde resins. The invention also contemplates film-forming pesticidal compositions and films formed therefrom wherein the pesticidally active film-forming component contains one of the modified phenol-formaldehyde resins.

Surface coatings wherein the film-forming component is a resin of the phenol-formaldehyde type have long been known to the art, having been introduced by Albert and Berend in 1910. The demand for phenolic resins has risen markedly over the years and such materials are now produced in large quantities in order to meet the needs of the paint and coating industries.

Although phenol-formaldehyde resins are formed by condensing a phenolic component with formaldehyde, the reaction conditions can be modified to a considerable extent and it is thus possible to control over a fairly wide range the properties of the resins. Thus, by utilizing an acid catalyst, there are obtained low molecular weight resins which are permanently fusible. These latter resins, the so-called Novolak type, are especially suited to the manufacture of varnish. Other applications of the acid catalyzed phenolic resins include their use as modifiers for other resins such as ester gum, nitrocellulose and cellulose acetate.

If, on the other hand, the phenol and formaldehyde are condensed in the presence of an alkaline catalyst there is obtained the so-called heat reactive resin. Because of its heat hardening property, such resins are much used in the manufacture of industrial baking enamels which have a high degree of chemical resistance. The baking or curing operation is commonly carried out at temperatures varying from about 275 to 400° F., depending upon the particular resin employed.

The properties of the phenol-formaldehyde resin can likewise be controlled or regulated by the choice of the phenolic reactant. For instance, resins having a greater degree of oil solubility are obtained from the higher alkylated phenols, and in this connection reference is made to p-tert.-butylphenol, p-tert.-amylphenol, p-tert.-octylphenol, p-phenylphenol, diisobutylphenol, bisphenols, e.g. bisphenol A, and the like. The utilization of lower alkylated phenols or phenol itself has the effect of depressing the oil solubility of the resin.

Other means of modifying the properties of the resin is the incorporation of various adjuncts such as rosin, kopal, abietic acid to a low stage phenolic resin and the final condensation allowed to proceed by heating. The aforesaid additives are useful in modifying the oil solubility of the resin, particularly with respect to drying oils.

The phenol-formaldehyde resins are available on the chemical market under a variety of trademarks, and in this connection reference is made to the various Bakelites. These describe a class of phenolic resins having different degrees of solubility in organic solvents, acids and alkalis. They are commonly classified as being non-heat reactive or heat reactive.

A typical product is Bakelite BV-1600 which is used to produce baked films characterized by high resistivity to acids, solvents, oils, fresh and salt water. This resin does not, however, have an especially good resistance to oxidizing agents or alkalis. Moreover, the films tend to be inflexible. The resin is commonly sold as a solution in ethyl alcohol. The baking procedure for this particular resin is 20 minutes in the neighborhood of 325° F. or if lower temperatures are utilized, a higher period of heating is recommended.

Another example of these commercial types of resins is Bakelite BV–17656, its predominant characteristic being that it yields films having a marked resistance to strong alkalis and oxidizing agents. The product is usually sold in cellosolve or similar solvents and the baking temperature is stated to be 375° F. for 15 minutes. For a more detailed discussion on the Bakelite phenol-formaldehyde resins, reference is made to the technical literature and the various brochures published by the Union Carbide Company who markets these products under the "Bakelite" trademark.

Generally speaking, the phenolic resins are capable of yielding coatings characterized by remarkable resistance to chemical and mechanical forces. However, under certain environmental conditions, such coatings are susceptible to biological attack in the form of invading fungi, bacteria and similar microorganisms. Coatings which are particularly prone are the exterior paints and finishes on ship decks and hulls, coatings for locks, dams, bridges, water storage tanks and similar outdoor and marine installations. These attacks occur almost exclusively in tropic climates where the higher temperature and humidity favor the growth of the microorganisms.

Another troublesome problem which has long harassed maritime interests is the clinging of barnacles and other sea creatures to the hulls of boats thereby necessitating periodic and expensive scraping operations in order to remove the attached organisms from the boat while it is in dry dock.

It has now been discovered that phenol-formaldehyde resin coatings having a surprisingly high degree of resistance to the attacks of pests can be produced by utilizing a phenol-formaldehyde resin in which at least part of the free hydroxyl groups have been reacted with a trialkyltin oxide and a provision of such modified phenol-formaldehyde resins constitutes the primary purpose and object of this invention. Another important object of the invention is to provide pesticidal compositions having as the active principle thereof the aforesaid trialkyltin modified phenol-formaldehyde resin. A still further object of the invention is to provide pesticidal film-forming compositions and films derived therefrom having as their active components a phenol-formaldehyde resin having at least part of the free hydroxyl groups reacted with a trialkyltin oxide. Other objects and purposes will become apparent as the description proceeds.

The pesticidally active phenol-formaldehyde resins as contemplated herein are prepared by heating a phenol-formaldehyde resin containing free phenolic functions with a trialkyltin oxide, each alkyl radical of which contains from 1 to 8 carbon atoms. In general, it has been ascertained that excellent results ensue by refluxing the trialkyltin oxide and the resin in a water-immiscible organic solvent of the type which facilitates removal of the water of the reaction by azeotropic distillation. Solvents which have proved suitable for this purpose are the normally liquid hydrocarbons and in this connection reference is made to benzene, toluene, xylene, mesitylene, and the like. The course of the reaction is readily controlable by varying the ratio of resin to trialkyltin oxide and by the reaction time or both. If desired, the reaction can be adjusted whereby only an occasional hydroxyl group undergoes reaction with the tin component or essentially all of the free hydroxyls may be replaced by the trialkyltin oxide residue. As above stated, the ratio of reactants and reaction time enable one to introduce the desired number of trialkyltin residue into the resin.

It has been our finding that only a few trialkyltin residues are required to be inserted in the resin in order to achieve biocidal activity. It has, for instance, been ascertained that the statistical replacement of every tenth phenolic hydroxyl group with a tributyltin oxide moiety results in a modified resin exhibiting a marked degree of biocidal activity as can clearly be ascertained by examining the data in the table below. The data referred to were obtained using the product of Example 2.

Reference is now made to the following examples which are presented for the purpose of illustration only since variations in practicing the invention without departing from the scope or spirit thereof will be apparent to those skilled in the art to which the said invention pertains.

EXAMPLE 1

To a solution of 32 g. of Super Beckacite 1001 in 100 ml. of benzene was added 30 g. (0.05 mole) of bis-tributyltin oxide and the resulting clear, homogeneous mixture refluxed for a period of two hours, during which time there was collected 0.9 ml. (0.05 mole) of water. After the two-hour heating period and after all of the water reaction had been removed, the reaction mixture was subjected to vacuum distillation in order to remove the benzene solvent and any volatile component. There was obtained a residual, highly viscous product. Analysis of this material, both chemical and instrumental, established it to be a phenol-formaldehyde resin in which 50% of the free phenolic hydroxyl groups had undergone reaction with the tributyltin oxide resulting in replacement of the hydrogen on the hydroxyl group with a tributyltin radical.

The Super Beckacite 1001 is a commercially available phenol-formaldehyde resin and was purchased from the Reichhold Chemicals, Inc., White Plains, New York. This particular resin is obtained by the condensation of butyl-phenol with formaldehyde.

EXAMPLE 2

A mixture of 64 g. of Super Beckacite 1001, 6 g. of bis-tributyltin oxide and 100 cc. of benzene was refluxed for two hours, during which interval 0.17 ml. of water was removed by azeotropic distillation. The reaction mixture was then subjected to vacuum distillation to remove solvent and volatile materials, and the modified phenol-formaldehyde resin obtained as a residual product had a softening point of from 30 to 40° C. Analysis of this product, using chemical and instrumental analysis, established that a tributyltin moiety had become attached to every tenth hydroxyl group of the resin.

As previously pointed out, the modified phenol-formaldehyde resins produced in accordance with the present invention are biocidally active substances and have been demonstrated to be effective in controlling and combating numerous pest organisms. It is, however, important to note that the film-forming and coating characteristics of the phenol-formaldehyde resin are still retained after introduction of the trialkyltin residues while at the same time the resin acquires the new and highly useful property of biocidal activity. It thus becomes possible to produce films and coatings with our modified phenol-formaldehyde resins which are not only useful as film-forming materials but, as above noted, protect the coated objects against attack by various pest organisms.

The particular formulation of coating compositions embodying the modified phenol-formaldehyde resins of the invention can in general be patterned in accordance with the practices and techniques commonly employed with the non-tin containing resins. For instance, a typical coating composition suitable for forming baked films is compounded by disolving the modified resin in ethyl alcohol in combination with the usual ketonic and ester solvent until the solids content is in the order of 20 to 30% and the resulting solution applied to the object to be coated followed by a baking operation at a temperature in the vicinity of 350 to 400° F. for 10 to 15 minutes. The resulting protective coating, in addition to its chemical and mechanical resistance, is resistant against pesticidal attack.

We are, of course, aware that there have been proposals for incorporating trialkyltin oxides as well as other toxicants in coating formulations, particularly as anti-fouling agents in marine applications such as ship hulls, decks, and the like. However, the procedures as hitherto practiced constitute mere mechanical admixtures of the resins and trialkyltin oxides, that is, the organotin moiety is not chemically bonded to the particular resin constituting the protective film. Since the trialkyltin oxides, particularly those in the range of highest pesticidal activity, i.e. the bis-tributyltin oxides, have a measurable water solubility, such additives tend to be leached out of the coating, especially when it is continuously exposed to water as when applied to boat hulls. Furthermore, there may be an appreciable loss of the trialkyltin oxide due to its vaporization from the coating during the curing or baking operation. Trialkyltin oxides have a perceptible vapor pressure at the curing temperatures employed.

Bis-trialkyltin oxides are also subject to degradation when exposed to sunlight and this constitutes another reason which operates against their mere mechanical inclusion in pesticidal film-forming materials. For instance, it is known that bis-tributyltin oxide, after four weeks of exposure to sunlight, undergoes transformation into dibutyltin oxide and tetrabutyltin, the extent of the decomposition being in the order of 5 to 20%. It should be noted that the decomposition products, i.e. dibutyltin oxide and tetrabutyltin, are quite ineffective against microorganisms. If, however, the trialkyltin oxides are chemically fixed to the phenol-formaldehyde resin, the drawbacks attendant to the use of mechanical mixtures of the organotin component and resin are mitigated to a very low level. In fact, the volatility and solubility of the bis-trialkyltin oxide-modified resin approach the original resin itself with respect to such properties. Moreover, it appears that the chemical bonding energy of the trialkyltin oxide to the resin molecule is of considerable strength and accounts for the enhanced stability toward actinic decomposition exhibited by the pesticidal film-forming compositions of the invention.

It is to be pointed out that the organotin modified phenol-formaldehyde resins of the invention are in themselves generally useful as pesticidal agents of which their utilization in the production of pesticidal film-forming compositions and films is a particularly valuable and specific property.

Biocidal compositions embodying the toxicants of the invention can be prepared in numerous ways which are known to the art. For example, spray formulations can be prepared by dissolving the lower organotin modified phenol-formaldehyde resin in a suitable organic solvent such as xylene and dispersing the solution in water in the presence of a surface active wetting or emulsifying agent. If desired, concentrated solutions of the organotin modified phenol-formaldehyde resin in solvents can be prepared embodying a wetting agent in amounts sufficient to effect emulsification of the toxicant on dilution with water.

Compositions may also be formulated in the form of a wettable powder. The organotin modified phenol-formaldehyde resin can be mixed with a small amount of surface active agent and a finely divided solid carrier as exemplified by talc, clay, e.g. attapulgite, kaolin, fuller's earth, wood flour or other similarly constructed solid carriers of the types commonly employed for the purpose of formulating biocidal powder compositions.

Suitable surface active materials include the anionic or cationic varieties and encompass the alkali metal and ammonium salts of long chain aliphatic carboxylic acids, sulfonates of the aromatic or long chain aliphatic hydrocarbons as typified by the sodium alkyl sulfates and sulfonates, alkyl aryl sulfonate salts, sulfonates of glycerides and their fatty acids.

In general, the aforedescribed wettable powder compositions contain about 1% to about 5% of a dispersing agent, about 25% to about 90% of the toxicant and the remainder of the mixture substantially consists of the inert solid diluent and carrier. The aqueous dispersions of the wettable powder which are applied to plants commonly contain about ⅛ to 1 pound of the toxicant for every 100 grams of water.

In the table below are presented various test data which demonstrate and establish the pesticidal activity exemplary of the organotin modified phenol-formaldehyde resins of the invention.

*Table*

| Example No. | Percent Inhibition at 50 p.p.m. (in vitro) | | |
|---|---|---|---|
| | *Aspergillus niger* | *Penicillium* sp. | *Escherichia coli* |
| 1 | 100 | 100 | 0 |
| 2 | 100 | 100 | 0 |

| Example No. | Percent Insect Mortality at 0.1% conc. | | |
|---|---|---|---|
| | *M. domestica* | *P. Americana* | *O. fasciatus* |
| 1 | 100 | 0 | 50 |
| 2 | 0 | 0 | 0 |

| Example No. | Conc. | Percent Mortality of Mites at 0.1–0.01% Conc. | | |
|---|---|---|---|---|
| | | Post Embryonic | Nymphs | Eggs |
| 1 | 0.1 | 100 | 100 | 25 |
| 1 | 0.05 | 100 | 50 | 0 |
| 1 | 0.01 | 100 | 30 | 0 |
| 2 | 0.1 | 100 | 75 | 0 |
| 2 | 0.05 | 90 | 0 | 0 |
| 2 | 0.01 | 50 | 0 | 0 |

*Table—Continued.*

| Example No. | Percent Mortality of House Fly (*M. domestica*) at 48 hrs. | |
|---|---|---|
| | Dosage in Micrograms/25 White Female Flies | Percent Mortality |
| 1 | 100 | 84 |
| | 50 | 32 |
| | 10 | 0 |

| Example No. | Foliage Fungi Inhibition in p.p.m. | | | | | |
|---|---|---|---|---|---|---|
| | Rust | | | Mildew | | |
| | 1,000 | 500 | 100 | 1,000 | 500 | 100 |
| 1 | 100 | 100 | 100 | 80 | 80 | 80 |
| 2 | 100 | 100 | 80 | 80 | 80 | 40 |

We claim:

1. A pesticidally active phenol-formaldehyde resin characterized in that at least part of the phenolic hydroxyl groups have been reacted with a trialkyltin oxide each alkyl radical of which contains from 1 to 8 carbon atoms whereby at least every tenth phenolic hydroxyl group of said resin has its hydrogen atom replaced with a trialkyltin residue having the same number of carbon atoms per alkyl radical as above recited.

2. The product according to claim 1 wherein the trialkyltin oxide is bis-tributyltin oxide.

3. A pesticidally active film-forming composition comprising as the film-forming component thereof a phenol-formaldehyde resin characterized in that at least part of the hydroxyl groups have been reacted with a trialkyltin oxide, each alkyl radical of which contains from 1 to 8 carbon atoms whereby the hydrogen of at least every tenth hydroxyl is replaced by a trialkyltin residue, and a solvent media for the film-forming component.

4. The composition according to claim 3 wherein the trialkyltin oxide is bis-tributyltin oxide.

References Cited by the Examiner

UNITED STATES PATENTS

| | | | |
|---|---|---|---|
| 3,031,483 | 4/1962 | Koopmans et al. | 260—429.7 |
| 3,037,039 | 5/1962 | Mazur | 260—429.7 |
| 3,129,236 | 4/1964 | Weissenberger | 260—429.7 |
| 3,214,453 | 10/1965 | Stern | 260—429.7 |

OTHER REFERENCES

Martin, Chemistry of Phenolic Resins, 1956, pages 46 and 51–54.

WILLIAM H. SHORT, *Primary Examiner.*

H. S. CHAIN, *Assistant Examiner.*